No. 740,946. PATENTED OCT. 6, 1903.
A. J. TAPLIN.
MARINE PROPULSION.
APPLICATION FILED JUNE 16, 1903.
NO MODEL. 5 SHEETS—SHEET 4.
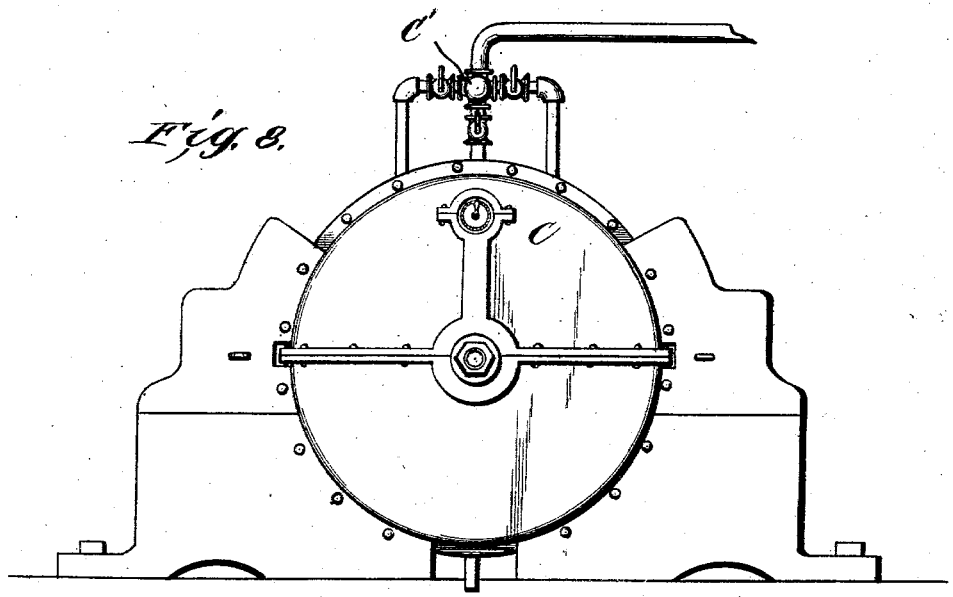
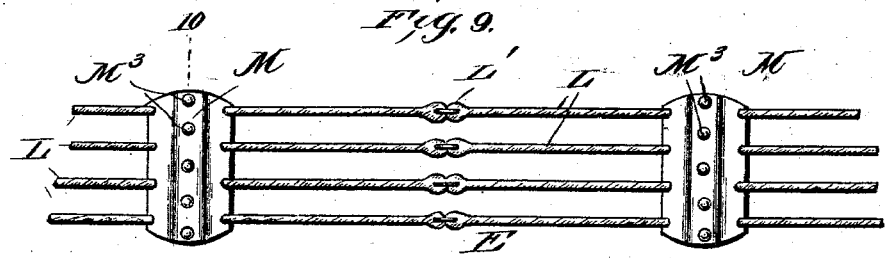
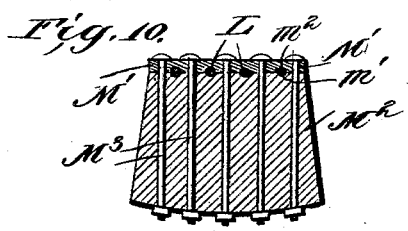
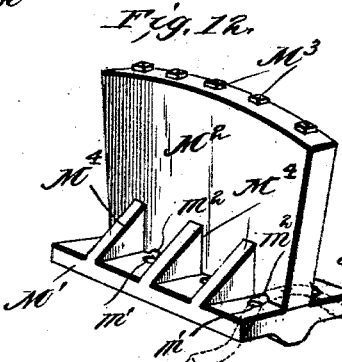
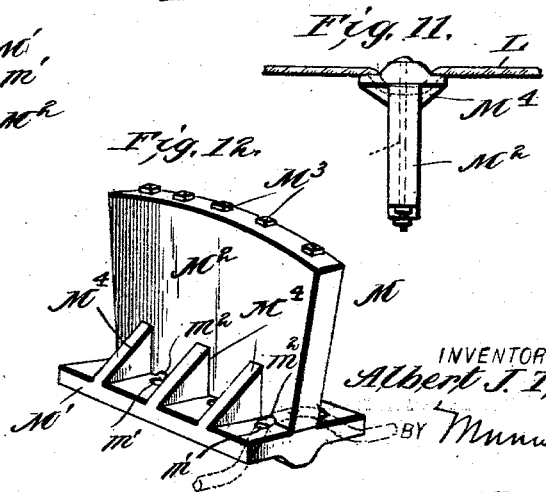
WITNESSES:
Fred D. Bradford.
Perry B. Turpin.
INVENTOR
Albert J. Taplin.
BY Munn & Co.
ATTORNEYS.

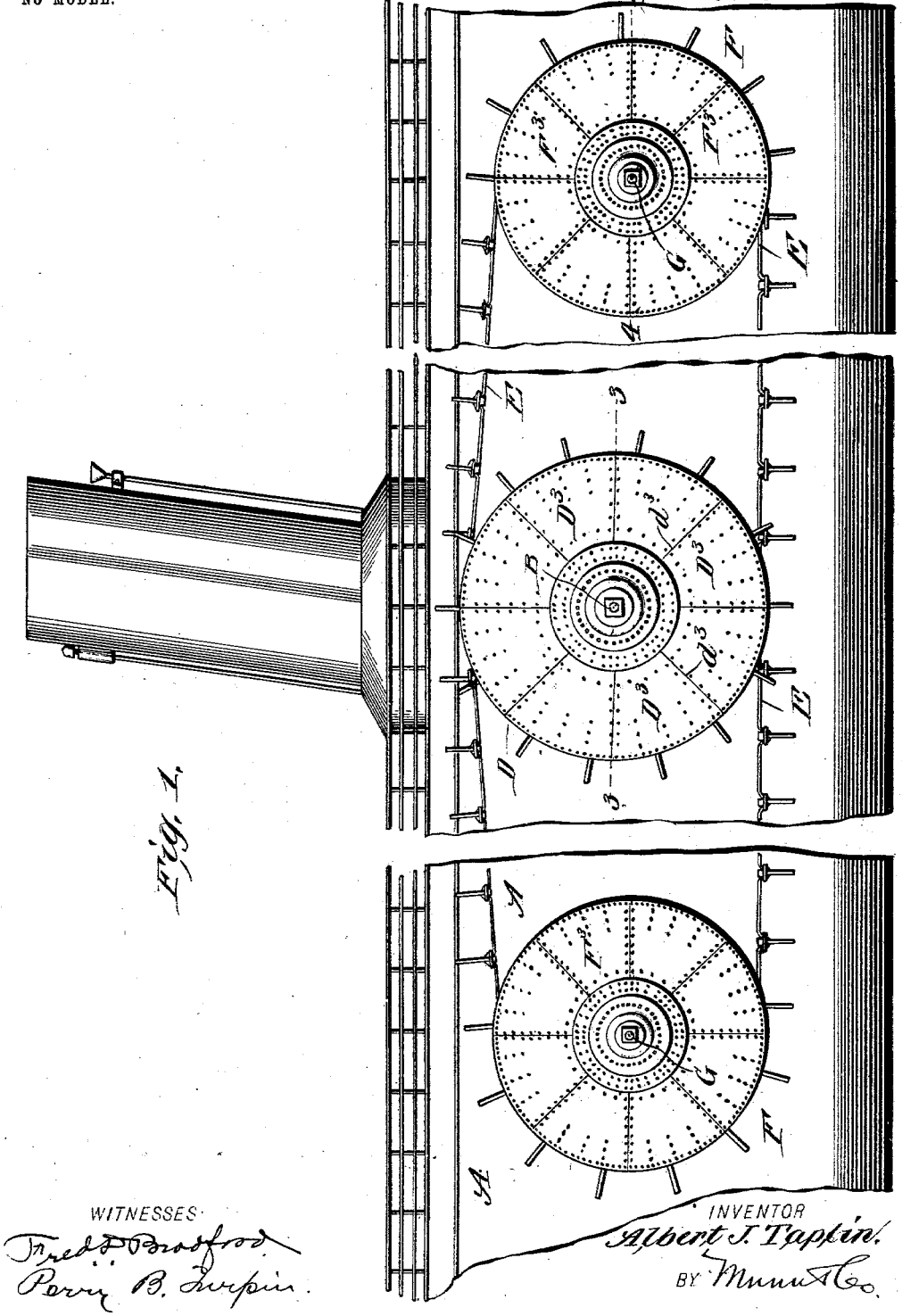

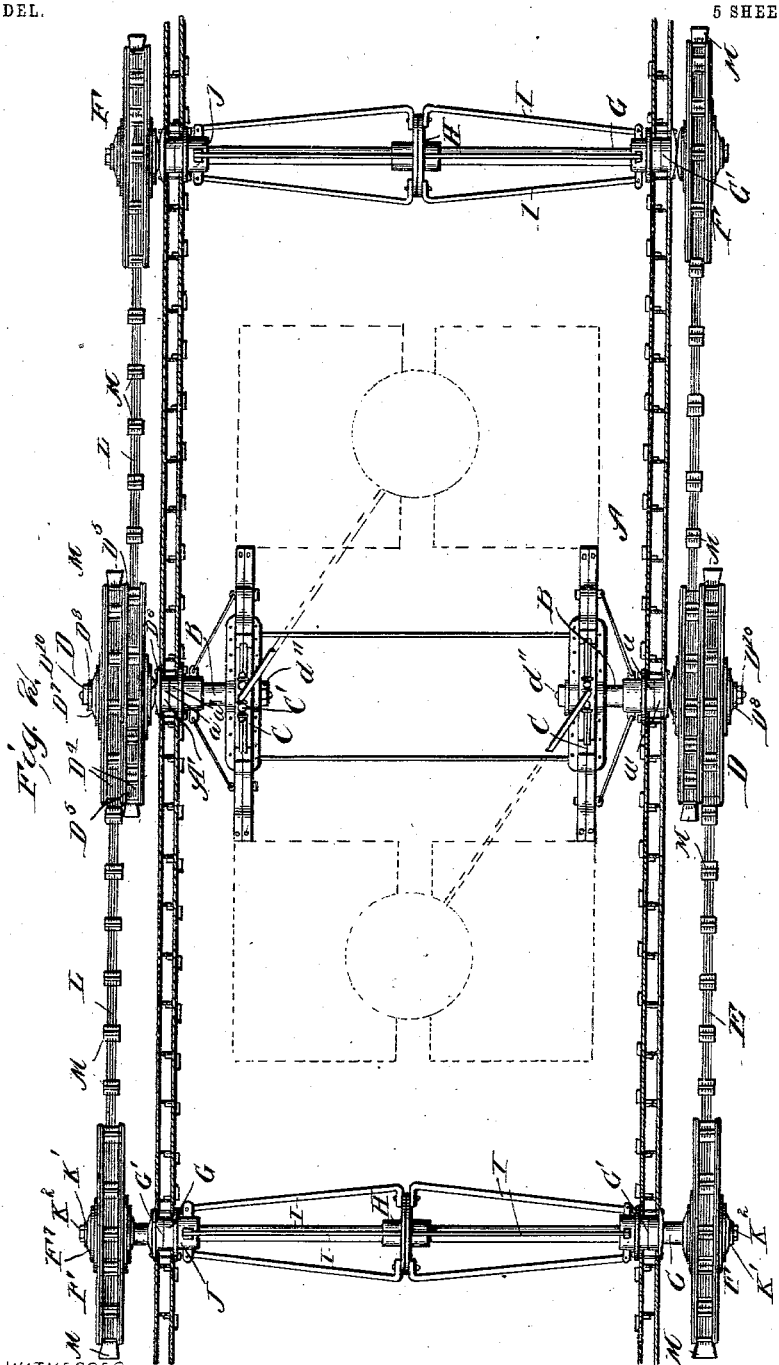

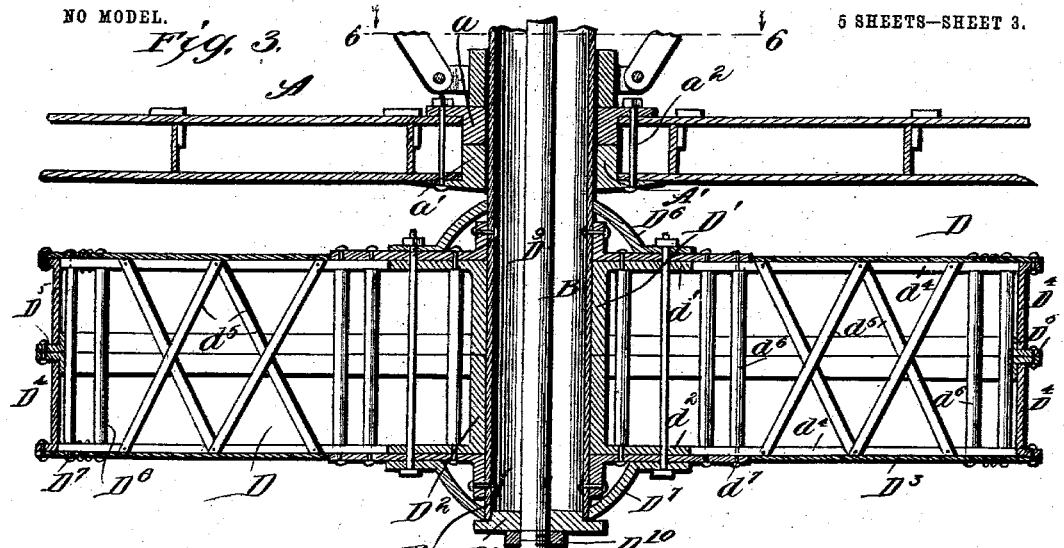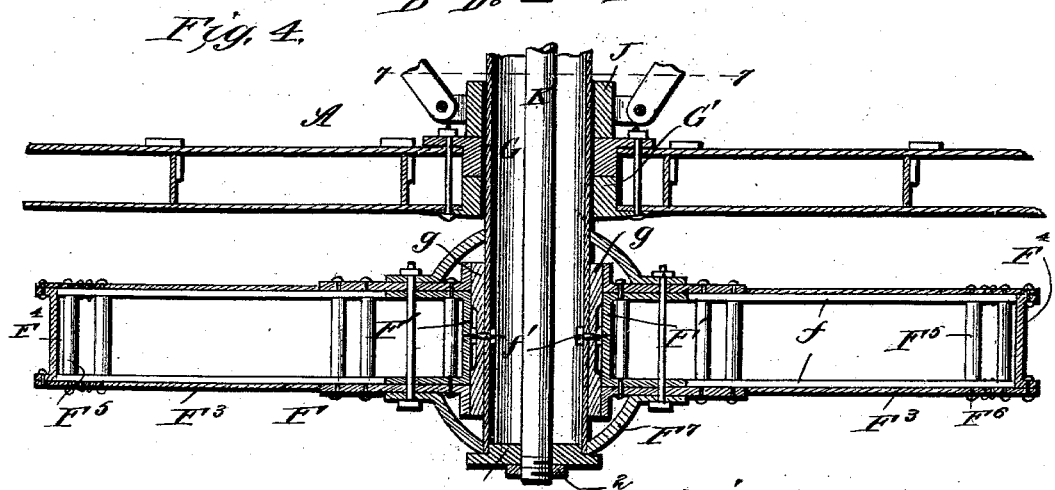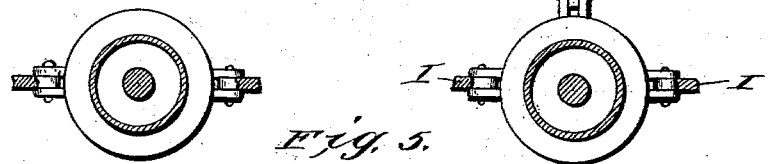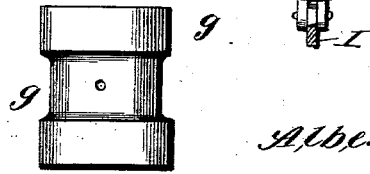

No. 740,946. PATENTED OCT. 6, 1903.
A. J. TAPLIN.
MARINE PROPULSION.
APPLICATION FILED JUNE 16, 1903.
NO MODEL. 5 SHEETS—SHEET 5.

WITNESSES:

INVENTOR
Albert J. Taplin,
BY
ATTORNEYS.

No. 740,946. Patented October 6, 1903.

UNITED STATES PATENT OFFICE.

ALBERT J. TAPLIN, OF WASHINGTON, DISTRICT OF COLUMBIA.

MARINE PROPULSION.

SPECIFICATION forming part of Letters Patent No. 740,946, dated October 6, 1903.

Application filed June 16, 1903. Serial No. 161,709. (No model.)

*To all whom it may concern:*

Be it known that I, ALBERT J. TAPLIN, a citizen of the United States, and a resident of Washington, in the District of Columbia, have made certain new and useful Improvements in Marine Propulsion, of which the following is a specification.

My invention is an improvement in marine propulsion, having for objects, among others, to provide a novel mechanism for propelling the vessel, including draft-propellers, which may be operated by fluid-vapor, water, or other power, seeking to produce a vessel-propelling mechanism which will be direct in operation, of the minimum weight, of little or no vibration, which will occupy the minimum space and will increase the carrying power, stability, and navigable properties of a vessel, and at the same time furnish a propeller and engine capable of driving a vessel through the water at the greatest speed attainable with safety and economy; and the invention consists in certain novel constructions and combinations of parts, as will be hereinafter described and claimed.

Figure 13:
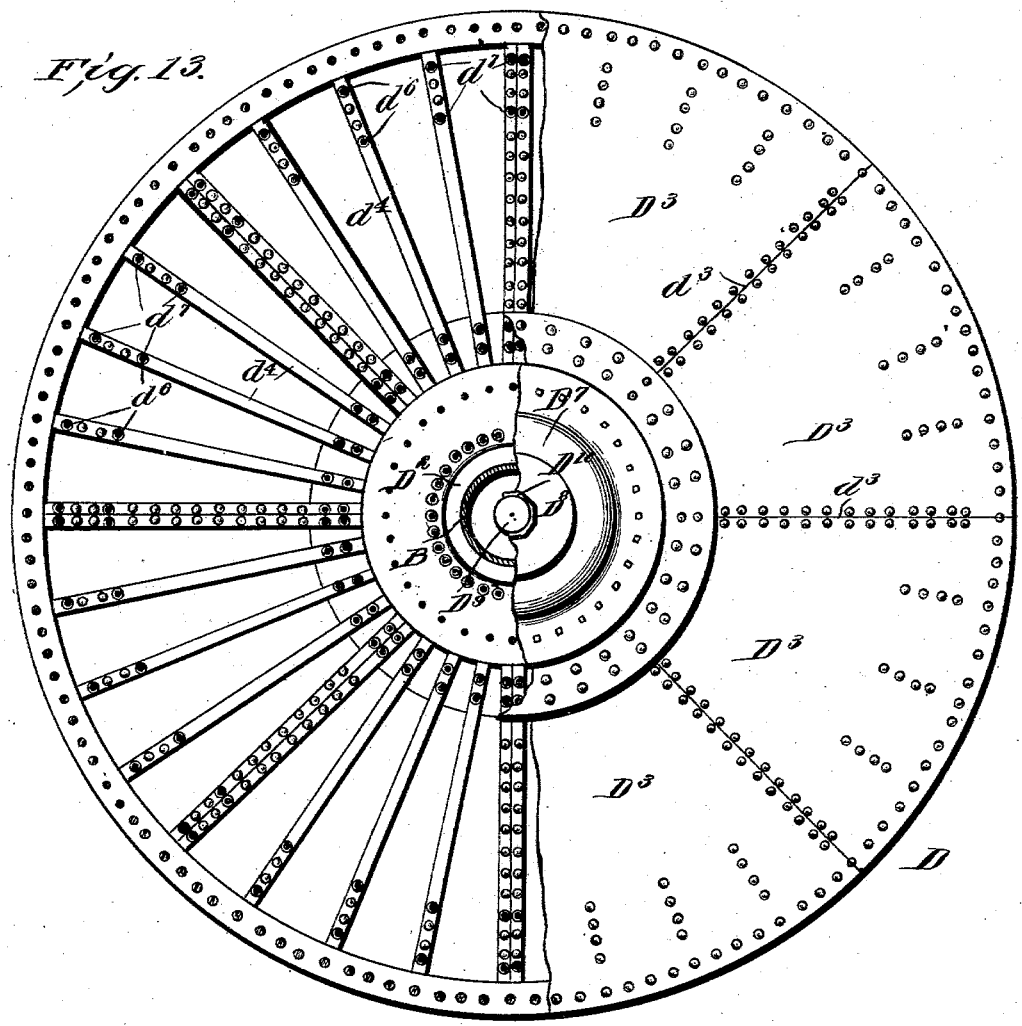
Figure 14:
Figure 15:
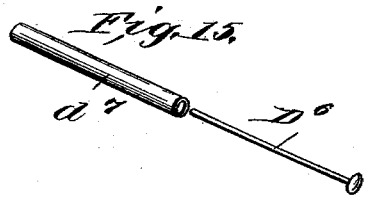

In the drawings, Figure 1 is a side elevation, parts being broken away, of a vessel provided with my improvements. Fig. 2 is a horizontal longitudinal section of a portion of a vessel provided with my improvements. Fig. 3 is a detail section on about line 3 3 of Fig. 1. Fig. 4 is a detail section on about line 4 4 of Fig. 1. Fig. 5 is a detail side elevation of the hub of one of the propeller-wheels. Fig. 6 is a detail section on about line 6 6 of Fig. 3. Fig. 7 is a detail section on about line 7 7 of Fig. 4. Fig. 8 is a detail elevation of one of the turbine-engines. Fig. 9 is a detail view of a portion of one of the endless propellers. Fig. 10 is a detail cross-section on about line 10 10 of Fig. 9. Fig. 11 is a detail side elevation of one of the propeller-blades with portions of the carrying-lines. Fig. 12 is a detail perspective view of one of the propeller-blades. Fig. 13 is a detail side elevation, partly broken away, of one of the propeller-wheels. Fig. 14 is a detail perspective view of one of the connecting-bolts of one of the propellers, and Fig. 15 is a detail perspective view of one of the spacing-tubes for the propellers.

The vessel-hull A may, in general respects, be of ordinary construction and is provided about midships at its opposite sides with bearings at A' for the main driving-shafts B B. These bearings A' are shown in detail in Fig. 3 and include the inner and outer collars $a$ and $a'$, which have the tubular portions fitting in the opening of the hull of the vessel and are provided with the flanges which overlap the walls of the vessel and are secured together by the series of bolts $a^2$, as best shown in Fig. 3. By this construction I afford a bearing for the shafts and also stay the hull of the vessel adjacent to the openings for the shafts, as will be understood from the said figure.

The shafts B are connected at their inner ends with their respective engines C. These engines are preferably of an improved type of turbine, which is described in detail and claimed in a separate application for patent filed by me May 27, 1903, serially numbered 158,948, and need not be described in detail herein. It may suffice, however, to say that means are provided at C' by which to reverse the engines in order that the opposite shafts B may be driven independently and in either direction, as may be desired, in order to drive the vessel ahead or astern or to steer the vessel, which may be accomplished by regulating the relative speed of the wheels at the opposite sides of the vessel or by reversing the driving devices at the opposite sides of the vessel, as may be preferred.

The main propeller-wheels D, secured on the outer ends of the shafts B, are of a special construction and include the hub, composed of inner and outer sections D' and $D^2$, abutting midway between the sides of the wheel D and provided with the radial flanges $d'$ and $d^2$, to which are bolted the plate-segments $D^3$, which go to make up the opposite sides of the wheel D and to which at their outer ends are connected the rim-plates $D^4$, which form pulley-surfaces separated by the flange $D^5$ for the endless propellers, which extend forward and aft, as shown in Fig. 2. The wheel D is braced at its inner end by the arch-plate $D^6$ and at its outer end by the arch-plate $D^7$, said plates being bolted in connection with the wheel, and in the outer end of the hollow shaft B is fitted the cap $D^8$, through which the tie-rod $D^9$ extends and is secured by the nut $D^{10}$, the opposite end of the rod $D^9$ extending through the engine C and being secured by a nut, as shown at $D^{11}$ in Fig. 2. This tie-rod $D^9$ tends to brace the tubular shaft and to hold the wheel steadily in connection with the engine by which it is driven.

The segment-plates $D^3$ fit closely together at their adjacent edges and are bolted at such point at $d^3$ to the radial spokes $d^4$ of the wheel D, truss-bars $d^5$ being arranged between the spokes at the opposite sides of the wheel and spacing-tubes $d^6$ and bolts $d^7$ being arranged between the opposite spokes to hold the same and segment-plates secured thereto properly apart. These driving-wheels D at the opposite sides of the vessel and about midships, receiving motion from their respective engines, operate to drive the endless propellers and also tend to give buoyancy to the vessel at its opposite sides in such manner as to steady the same in operation. The endless carriers E pass around the pulley portions $D^4$ of the drive-wheel and thence around the guide-wheels F on opposite sides of the main or drive wheel, as shown in Figs. 1 and 2. These guide-wheels F turn on the extended ends of the shaft G, so that they may turn independently, so the opposite guide-wheels F may be turned in opposite directions, if desired.

The shafts G are hollow and extend from side to side of the vessel-hull and project beyond the same to support the guide-wheels F, which journal thereon in the manner presently described. The shaft G fits in bearings G', which are similar to the bearings A' for the shaft B, and upon the shaft G, about midway between the sides of the vessel, is fitted a ring H, which is connected by truss-rods I with collars J, located upon the shaft adjacent to the inner surfaces of the opposite sides of the vessel-hull and tend to strengthen the shaft G and give rigidity to the hull of the vessel adjacent to the points where the said shaft G is supported.

Upon the extended ends of the shaft G are secured the tubular collars $g$, upon which the wheels F turn, said wheels being provided with hub portions F', turning on the collar $g$ and having the spokes $f$, to which the segment-plates $F^3$ are bolted at their adjacent edges, as shown in Fig. 4. The pulley portion or rim $F^4$ of the wheel receives the endless propeller, and the opposite sides of the wheel are braced apart by the spacing-tubes $F^5$, through which the bolts $F^6$ extend, and arch-bars $F^7$ are arranged at the inner and outer sides of the hub portion of the wheel, as shown in Fig. 4. A stay-rod K extends through the hollow shaft G and through caps K' at the opposite ends of said shaft and are secured by the nuts $K^2$, as will be understood from Figs. 2 and 4 of the drawings. These guide-wheels being hollow, like the main drive-wheels, increase the buoyancy and stability of the vessel.

The endless propellers E are constructed alike and are driven by the pulley portions of the guide-wheels and extend from the drive-wheels in opposite directions and are so arranged that the lower runs of both propellers at the same side of the vessel will be caused to move in the same direction, and thus operate to move such side of the vessel ahead or astern, according to the direction of revolution of the drive-wheel. I prefer to construct the endless propellers of the cables L, which may be suitably jointed at L', and the blades M, secured to and carried by the said cables and clamped thereon, by the constructions which I will now describe. A number (which may be four, as shown, or more or less) of the cables are provided ranging side by side, and the blades M are provided with passages for the said cables.

The blades M consist of the base-plates M' and the bodies $M^2$, secured together by the bolts $M^3$, the body $M^2$ being fitted edgewise to the face of the base-plate M', midway between the edges thereof, and having in its inner edge the grooves $m^2$ in line with the openings $m'$, formed through the base-plate M' on opposite sides of the body $M^2$, so the cables may be passed through the openings $m'$, thence through the grooves $m^2$, to carry the blades, as will be understood from Figs. 10, 11, and 12 of the drawings. Brace-blocks $M^4$ may be provided on opposite sides of the bodies $M^2$ of the blades for bracing the same steadily in position for use. I provide as many of these blades M as may be desired, locating them at frequent intervals along the cables, as best shown in Figs. 1 and 2 of the drawings.

In practice the drive-wheels and the guide-wheels may preferably be made of sheet-iron, such as boiler-iron, and the necessary bars and tubes of suitable metal, so the said wheels will be both strong and buoyant, as well as durable.

It will be understood that I do not desire to be limited in the broad features of my invention to the specific arrangement of drive and guide wheels shown, as it may be desirable in some instances to vary such arrangement, and in some cases the front or the rear guide-wheel and its corresponding endless propeller may be omitted without departing from the broad principles of my invention.

Having thus described my invention, what I claim as new, and desire to secure by Letters Patent, is—

1. The improvement in marine propulsion as herein described, comprising in combination a vessel-hull, the drive-wheels having their shafts journaled to said hull and composed of the side plates, rim, bracing and framing forming the hollow buoyant wheel, the engine within the hull for turning said wheel, the wheel having the pulley-surfaces for the two endless propellers, the hollow buoyant guide-wheels on opposite sides of the drive-wheel and having pulley-surfaces for the endless propellers, and the endless propellers passing around the drive-wheel and their respective guide-wheels and composed of the cables and the paddles or blades having openings through which the cables pass substantially as and for the purposes set forth.

2. The combination in marine propulsion of a drive-wheel, guide-wheels on opposite sides of the drive-wheel, and endless propellers passing around the drive-wheel and around their respective guide-wheels and provided with blades or paddles substantially as set forth.

3. A vessel provided on its opposite sides with drive-wheels and with guide-wheels in front and rear thereof and the endless propellers passing around their drive-wheels and their respective guide-wheels substantially as set forth.

4. The combination with the hull of the guide-wheels, the shaft extending through the hull and beyond the outer sides thereof and supporting the guide-wheels, the truss devices for bracing said shaft and the drive-wheels journaled to the hull and the endless propellers passing around the drive-wheels and their respective guide-wheels substantially as set forth.

5. The combination with the hull of the drive-wheels having their shafts journaled thereto, the independent engines connected with said shafts, the guide-wheels on opposite sides of the drive-wheels and the endless propellers passing around the drive-wheels and their respective guide-wheels substantially as set forth.

6. The combination with the vessel-hull having an opening, of the bearings made in sections fitting in said openings and having the flanges overlapping the inner and outer sides of the hull, the bolts passing through said flanges and hull, and the shafts supported in said bearings substantially as set forth.

7. A wheel for marine propulsion comprising the radial spokes, the segmental side plates bolted at their adjacent edges to said spokes and the rim-plates and spacing devices substantially as set forth.

8. In marine propulsion a propeller comprising the cables extending side by side and the blades or paddles comprising the body portions and the base-plates secured to the inner edges of the body portions and having openings on opposite sides of the joints with said body portions through which said cables pass, substantially as set forth.

9. The combination in a propeller for marine propulsion of the cables, and the blades or bodies comprising the base-plates having openings for the cables, the body portions grooved to fit said cables and the bolts for securing the body portions to the base-plates substantially as set forth.

10. A propeller for marine propulsion comprising a plurality of cables extending side by side and a plurality of blades or paddles composed each of a base-plate and a body-plate grooved in its inner edge to fit the cables and secured at such edge to the base-plate, the latter being provided with openings for the cables substantially as set forth.

11. The combination with the driving and guiding wheels of the endless propellers comprising the cables and the blades or paddles consisting of the base-plates provided with openings for cables and the body-plates secured at their inner edges to the base-plates between the openings thereof and grooved in said edges in line with the openings in the base-plates, substantially as set forth.

12. The combination of the vessel-hull, the drive-wheels having the pulley-surfaces for the forward and aft propellers and having their shafts journaled in the vessel-hull, the independent engines for driving said shafts, the guide-wheels on opposite sides of their respective drive-wheels and the endless propellers passing around the drive-wheel and their respective guide-wheels and comprising the cables and the blades or paddles strung thereon substantially as set forth.

ALBERT J. TAPLIN.

Witnesses:
SOLON C. KEMON,
PERRY B. TURPIN.